June 25, 1963 G. A. HEBERT 3,095,551
LOAD CELL
Filed July 17, 1961

INVENTOR:
Gerald A. Hebert,
BY
Bair, Freeman & Molinare
ATTORNEYS.

United States Patent Office 3,095,551
Patented June 25, 1963

3,095,551
LOAD CELL
Gerald A. Hebert, Chicago, Ill., assignor, by mesne assignments, to Goodman Manufacturing Company, Chicago, Ill., a corporation of Illinois
Filed July 17, 1961, Ser. No. 124,587
2 Claims. (Cl. 338—5)

This invention relates to load cells and more particularly to electric strain gauge type load cells for weighing and other force measuring applications.

In my copending application, Serial No. 52,717 filed August 29, 1960, I have proposed a very simple and compact load cell which is extremely efficient for various types of weighing and force measuring operations. The present invention relates to an improvement in load cells of the type disclosed in said application.

It is one of the objects of the present invention to provide a load cell in which the deformable disc to which the strain gauges are attached is formed integrally with the body or casing of the load cell.

According to a feature of the invention, the body of the load cell is formed with a central cavity terminating in a flat bottom short of one end of the body to leave a flat metal disc integrally secured around its periphery to the body.

Another object of the invention is to provide a load cell which is protected against damage due to overloading.

According to a feature of the invention a plug is provided fitting into the body cavity and terminating in a reduced diameter tip spaced slightly from the central portion of the disc to engage the disc and limit deflection thereof.

Figure 2:
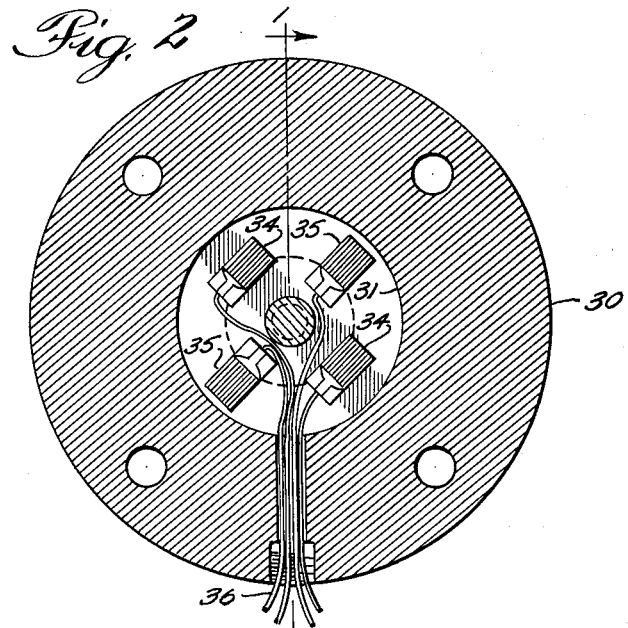
Figure 1:
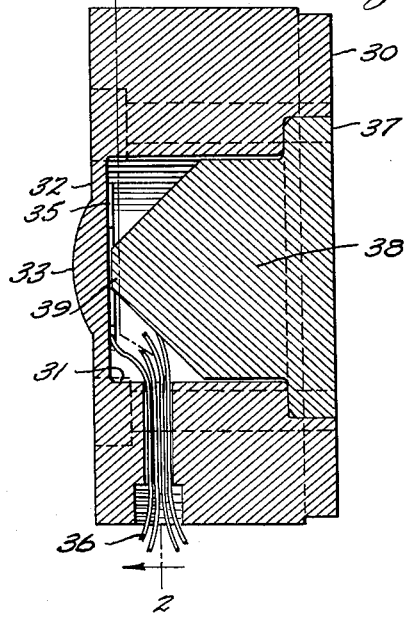

The above and other objects and features of the invention will be more readily apparent from the following description when read in connection with the accompanying drawing in which:

FIGURE 1 is an axial section through a load cell embodying the invention on the line 1—1 of FIGURE 2; and FIGURE 2 is a transverse section on the line 2—2 of FIGURE 1.

The load cell as shown comprises a base or body 30 formed of a high grade steel and having a central cylindrical cavity 31 drilled into one side thereof and terminating in a flat bottom short of the other side to leave a flat disc 32 integrally connected around its periphery to the body. The disc may be provided with a spherical projection 33 on its outer surface to which the load to be measured is applied.

The inner surface of the disc carries two pairs of strain gauges 34 and 35 which are secured to the inner surface of the disc 32 between its central portion and its periphery as best seen in FIGURE 2. The strain gauges 35 are arranged as shown extending radially of the disc and function as the active strain gauges while the strain gauges 34 are arranged at right angles to radii through the disc and function as passive strain gauges for temperature compensation. The several strain gauges may be connected to wiring 36 extending through a radial opening in the body beneath the disc 32 to any desired indicating or recording circuitry. It will be understood, of course, that the wiring may be sealed in the opening to prevent ingress or egress of water.

The open end of the recess or cavity 31 is closed by a plate 37. As shown, the recess is shouldered at its open end and the plate fits against the shoulder to close the cavity completely. The plate is preferably sealed in the body by soldering or other sealing method to prevent ingress of any moisture into the load cell.

The plate 37 carries a plug portion 38 extending toward the disc 32 and tapering in its upper part to a reduced diameter tip 39 which in the normal position of the parts is spaced slightly from the inner surface of the disc at its center. Normally the spacing between the reduced tip 39 and the disc would be on the order of a few thousandths of an inch. In the event the disc is subjected to excessive loads which would tend to deflect it beyond its elastic limit, or at least sufficiently to damage the strain gauges, the center part of the disc will engage the reduced tip 39 and its deflection will be limited thereby. Therefore, the possibility of damage due to overloads is eliminated.

When a load is applied to the projection 33 the disc 32 will be deflected inwardly of the body and the strain in the disc will be measured by the strain gauges 35. The strain gauges 35 and the half passive gauges 34 may be connected in a bridge circuit in the usual manner with the output of the bridge circuit operating an indicator or recorder. After a predetermined load has been applied to the disc 32 it will deflect to the point at which its inner central surface engages the reduced diameter tip 39. The tip 39 will prevent further deflection of the disc so that damage to the disc or strain gauges will be positively prevented by excessive loading.

While one embodiment of the invention has been shown and described in detail, it will be understood that this is illustrative only and is not to be taken as a definition of the scope of the invention, reference being had for this purpose to the appended claims.

What is claimed is:
1. A load cell comprising a metal body formed with a central cavity therein terminating in a flat bottom short of one end of the body to leave a flat metal disc of uniform thickness integrally secured around its periphery to the body, a central projection on the outer face of the disc to receive a load to be measured and apply it to the central portion of the disc, and strain measuring devices secured to the disc between the central portion and the periphery thereof.
2. A load cell comprising a metal body formed with a central cavity therein terminating in a flat bottom short of one end of the body to leave a flat metal disc of uniform thickness integrally secured around its periphery to the body, a central projection on the outer face of the disc to receive a load to be measured and apply it to the central portion of the disc, strain measuring devices secured to the disc between the central portion and the periphery thereof and a plug closing the open end of the cavity and terminating in a reduced diameter tip spaced slightly from the central portion of the disc to limit deflection of the disc.

References Cited in the file of this patent
UNITED STATES PATENTS

| | | |
|---|---|---|
| 2,580,407 | Clark | Jan. 1, 1952 |
| 2,992,556 | Webster | July 18, 1961 |
| 2,995,034 | Boiten | Aug. 8, 1961 |